United States Patent [19]

Nagata et al.

[11] Patent Number: 5,410,534
[45] Date of Patent: Apr. 25, 1995

[54] OPTICAL INFORMATION RECORDING MEDIUM

[75] Inventors: Ken'ichi Nagata, Nishinomiya; Eiji Ohno, Hirakata; Nobuo Akahira, Yawata; Ken'ichi Nishiuchi, Moriguchi; Noboru Yamada, Hirakata, all of Japan

[73] Assignee: Matsushita Electric Industrial Co., Ltd., Osaka, Japan

[21] Appl. No.: 77,374

[22] Filed: Jun. 17, 1993

[30] Foreign Application Priority Data

Jun. 17, 1992 [JP] Japan .................. 4-157728
Jun. 17, 1992 [JP] Japan .................. 4-157732

[51] Int. Cl.⁶ .................................. G11B 3/70
[52] U.S. Cl. .................. 369/275.4; 369/275.2; 369/288
[58] Field of Search ........... 369/275.2, 275.4, 275.1, 369/122, 288, 109

[56] References Cited

U.S. PATENT DOCUMENTS

| 4,216,501 | 8/1980 | Bell ........................... 358/128.5 |
| 5,130,971 | 7/1992 | Ohno et al. ................ 369/116 |
| 5,294,523 | 3/1994 | Nagata et al. ............. 430/495 |

FOREIGN PATENT DOCUMENTS

| 0197256 | 10/1986 | European Pat. Off. . |
| 0294932 | 12/1988 | European Pat. Off. ......... 369/273.2 |
| 0360466 | 3/1990 | European Pat. Off. . |
| 0376678 | 7/1990 | European Pat. Off. . |
| 2061594 | 5/1981 | United Kingdom . |
| 2084786 | 4/1982 | United Kingdom . |

OTHER PUBLICATIONS

Patent Abstracts of Japan; vol. 10, No. 180 (P-471) Jun. 24, 1986.
Patent Abstracts of Japan; vol. 17, No. 127 (P-1502) Mar. 17, 1993.

*Primary Examiner*—Paul M. Dzierzynski
*Assistant Examiner*—David Vernan Bruce
*Attorney, Agent, or Firm*—Wenderoth, Lind & Ponack

[57] ABSTRACT

In an optical recording medium having concave and convex type signal pits formed on a substrate surface, a reflection layer is formed on the signal pits in such a manner that a reflection index of an interior of the signal pits is higher than a reflection index at a periphery of the signal pits with respect to a given reproduction laser beam wavelength. In an optical recording medium having a phase change recording layer which reversibly changes optical states upon application of laser energy, a structural phase difference between a reflection beam of non-recorded regions and a reflection beam of recorded regions of the optical recording medium with respect to the wavelength of a reproduction laser beam is in a range of $(0.5-1.5)+2\ n\pi$ radians, where n is an integer. The phase change recording layer has principle components of Ge-Sb-Te or Sb-Se.

10 Claims, 12 Drawing Sheets

Fig. 1
(a)
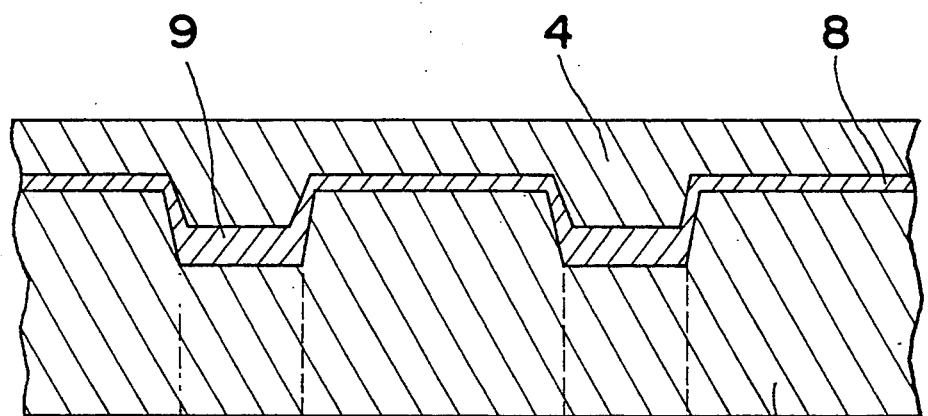
(b)
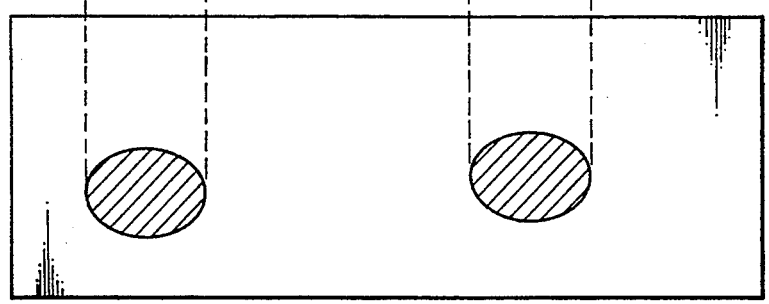

Fig. 9

| conventional | invention |
|---|---|
| phase difference : $\pi$<br>R1 = R2 | phase difference : $\pi$<br>R1 > R2 |
| 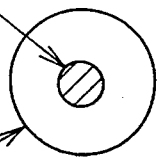 memory mark / range to be disposed by reproducing ligh | 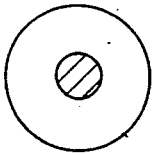 |
| reflection light R1 from mark |  | reflection light R1 from mark |  |
| reflection light from non-memory portion | 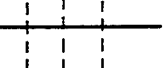 | reflection light from non-memory portion |  |
| interference effect | 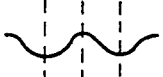 | interference effect | 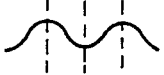 |
| <most suitable mark shape> | <non suitable mark shape> |
| 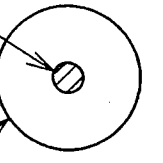 memory mark / range to be disposed by reproducing light | 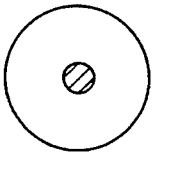 |
| reflection light R1 from mark |  | reflection light R1 from mark |  |
| reflection light from non-memory portion | 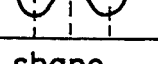 | reflection light from non-memory portion | 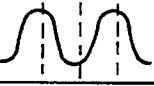 |
| interference effect | 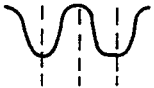 | interference effect | 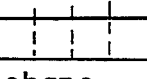 |
| <non suitable mark shape> | <most suitable mark shape> |

Fig. 10
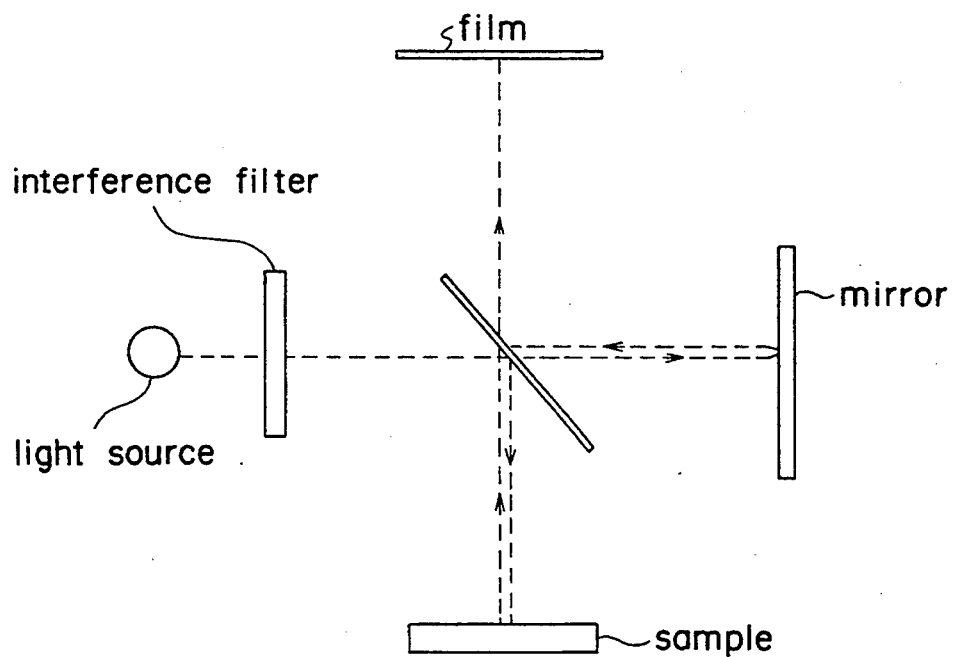
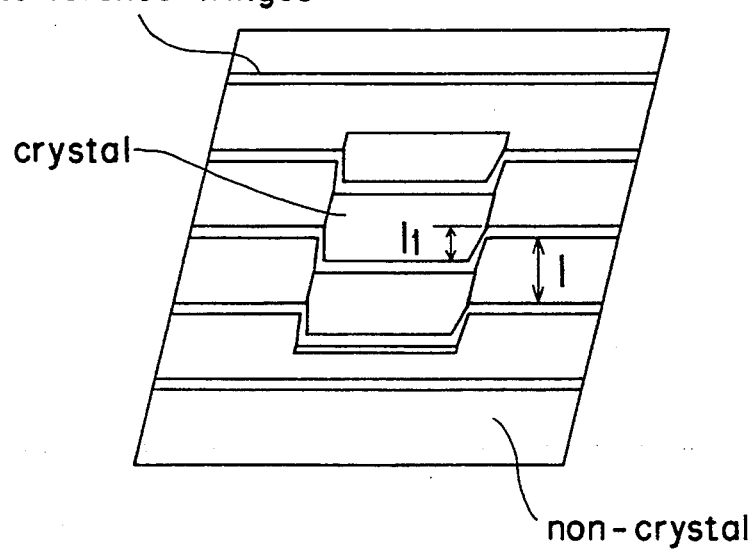

OPTICAL INFORMATION RECORDING MEDIUM

BACKGROUND OF THE INVENTION

The present invention generally relates to an optical information recording medium, and especially an optical disk from which high density recorded information may be reproduced using laser beams or the like.

Generally, a technique is known of recording minute signal pits on a substrate having optical spot diameters which are on the order of a light wavelength used upon reproduction. Such a technique is put into practical use in the form of a read only type (ROM=Read Only Memory) optical disk such as compact disk (CD) and a laser video disk (LVD). Another known technique is directed to an optical phase change type optical disk which uses chalcogenide as a recording film material and has been put into practical use as a write once type (WORM=Write Once Read Many) optical disk capable of recording and reproducing signals or a rewritable optical disk capable of recording, reproducing and erasing of signals.

In a read only type optical disk, a signal track formed of small concave and convex pits is provided in advance between a transparent disk substrate such as resin or the like and a reflective film such as Al or the like. During signal reproduction, a scanning operation is effected on a signal track having optical spots by focusing laser beams. The laser beams are reflected at locations where pits do not exist and are substantially diffracted at locations where pits exist. By using an optical detector, the location of the signal pits can be discriminated in accordance with a magnitude of the reflected light.

In an erasable optical phase change type of optical disk, signal marks are formed in accordance with a crystal condition of a recording film material. The recording film, when melted and quenched upon application of laser beams, becomes a crystalline state. Optical constants (refractive indexes, extinction coefficients) of recording marks located on the recording film differ according to a non-crystalline state or a crystalline state of each location, and thus a reflected quantity of light recording mark locations also varies accordingly. Signals are detected in accordance with the magnitude of reflected light. In order to erase the signals, the recording film is increased in temperatures by application laser beams, having a lower power than those used during recording, so as to return recording mark location to the non-crystalline state.

As a recording film material, typically a material is used as above which changes in optical phase between a non-crystalloid state and a crystal state and which has Te, In, Sb, Se or the like as principal components, or a material is used which reversibly changes in optical phase between two different crystal states. One merit of optical change recording is that information signals can be overwritten using a single laser beam. When the laser output is modulated in accordance with the information signal between two levels, i.e., a recording level and erasing level, and is applied to a recorded information track, a new signal can be recorded while the existing information signal is erased (Japanese Patent Laid-Open Publication No. 56-145530).

The write once type optical phase change optical disk also records and reproduces signals with the use of the reflection index of a recording film.

It has been proposed to provide a disk construction in which a structural phase change is caused between a non-recorded portion and a recorded portion with respect to the wavelength $\lambda$ of reproduction laser beams (Japanese Patent Laid-Open Publication No. 3-41638, and Japanese Patent Laid-Open Publication No. 3-157830). When the recorded portion (recording mark) is read out reflection index change, a suitable reproduction signal cannot be obtained without the area of the recording condition of the range sufficiently larger as compared with the size of the laser beams to be used for the reproduction. This is because the magnitude of a reflected light beam is proportional to a value averaged with the respective area and the optical intensity distribution being weighted upon the reflection index of the recording mark and the reflection index of the peripheral unrecording region as the optical intensity of the reproduction beams is generally Gausian distribution and is spread more externally than the optically phase changed recording mark. In the case of the structural phase change construction, the structural phases of the recorded portion and the non-recorded portion are different, and the reflected quantity of light changes in accordance with the extent to which the structural phases interfere with each other. Preferably, the change in the reflected quantity of light is largest when the structural phase difference of the reflective beam in the recorded portion and the non-recorded portion is $(1+2n)\pi$ radians (n is an integer). The effect of interference is largest and therefore, the change in reflected light intensity is larger when the reflection intensity from the recorded portion is equal to the reflection intensity from the peripheral non-recorded portion. A larger reproduction signal can be provided when the recording marks are smaller than the size of the reproduction beam. Thus, a larger signal magnitude is provided, and thus a higher density recording operation can be effected using a recording mark having an area which is smaller than that of the reflection index change reproduction construction with respect to a reproduction operation using the same reproduction optical beam.

In the conventional optical disk, the limit of recording density is determined by the extent to which signal marks can be made small and still be detected using light spots focused up to the wavelength limit. The size of the light spots is determined by the wavelength of the laser beam and the numerical aperture (NA) of the objective lens for focusing the laser beam. The light spot can be made smaller, as the wavelength of the laser beam is made shorter or the numerical aperture of the objective lens becomes larger. The improvement in the recording density can be effected only with the development of a shorter wavelength laser and/or a larger numerical aperture objective lengths, which cannot be realized easily.

SUMMARY OF THE INVENTION

Accordingly, the present invention has been developed with a view to substantially eliminate the above discussed drawbacks inherent in the prior art, and for its essential object to provide an improved optical information recording medium.

Another important object of the present invention is to provide an improved optical information recording medium in which a recording density is improved without making the wavelength of the reproduction light shorter and/or making the numerical aperture of the objective lens larger.

In accomplishing these and other objects, according to one preferred embodiment of the present invention, concave and convex pits are formed on a substrate of a read only type optical disk, and a reflective film is provided thereon so as to raise the reflection index of an interior portion of the pits of the optical information recording medium in which a signal is recorded in advance. Preferably, the reflection layer film of the interior of the pits is thicker than the peripheral reflection layer film, or the reflection layer has a different material quality in the pit interior than in its periphery, or the concave and convex pits are formed of a material having refractive index which is different from that of the substrate.

The reflected light quantity from the recording pit can be made approximately equal to the reflected light quantity from the periphery thereof using relatively small recording pits. The recording signals formed using such smaller pits can be reproduced even if the size of the optical spot is the same, thus improving the recording density.

In the case of the optical phase change type of disc (the write once type and the erasable type), the range of the structural phase difference of the reflection beam of the non-recorded region and of the recorded mark region, with respect to the wavelength $\lambda$, of a laser beam for reproducing the information from the recording film is (0.5 through 1.5) $\pi + 2 n\pi$ radians n: integer. The reflection index R1 of the recorded mark region of the above described optical information recording medium is larger than the reflection index R2 of the non-recorded region with respect to the wavelength $\lambda$ of the laser beam for reproducing the recorded information. Preferably, it is assumed that the range of the structural phase difference of the reflection beams in the non-recorded region and the recorded mark region is $(2n+1) \pi$ radians n: integer.

Preferably it is assumed that R1 is a 1.3 multiple or more of R2 and R2$\leq$15%. In the erasable type of optical phase change optical disk, it is preferred that the recording film material be composed of a material in which Ge-Sb-Te is a principal component and the thickness of the recording film is 40 nm or less. Further, it is preferred that the composition ratio of the principal component be within the range represented by (Ge) x (Sb) y (Te) z $0.10 \leq y \leq 0.35$ $0.10 \leq y$ $0.45 \leq z \leq 0.65$ $x+y+z=1$.

Further, the composition ratio of Ge, Sb, Te is preferred to be within the range represented by $(Ge_2Sb_2Te_5)$ x $(GeSb_2Te_4)1-x$ $0 \leq x \leq 1$ With such a construction as described hereinabove, the same signal amplitude is obtained by the formation of smaller recording marks. A high density can be realized, since the recording mark can be made small without deterioration in the signal quality. At the same time, the erasing characteristics, particularly the erasing power tolerance, can be improved. As the recording marks can be made smaller, the thermal load applied upon the recording medium is reduced as compared with larger recording marks.

A conventional read only type disc is shown in FIG. 2. FIG. 2(a) is a sectional view and FIG. 2(b) is a plan view. A signal is stored on the substrate 1 as concave and convex recording pits 2 with a reflective layer 3 such as Al or the like formed thereon, and with a protective overcoat layer 4 being provided on the reflective layer 3.

The reproduction of the signal is effected by scanning the recording pits with a laser spot 6 with the laser beam 5 having been focused up to the wavelength limit. The reflection beam from the recording medium directly returns to a light detector in a region where recording pits do not exist. Since the reflection beam from the recording pit is different in phase from the reflection beam from the periphery of the recording pit, the reflection beam from the recording pit is diffracted and does not return to the optical detector. Since the reflected quantity of light reaching the light detector varies according to the presence or absence of the recording pits, the recorded signal can be detected.

The diffraction characteristics of the reflection beam largely depend upon the depth and the shape of the recording pits.

Changes in the depth of a recording pit changes the structural phase difference of the reflection beam caused by the existence of the recording pit. The structural phase difference of the reflection beam for obtaining a large diffraction effect is $\pi$ radians, and thus, the pit depth becomes $\lambda/(4N)$ (where $\lambda$ is the wavelength of the reproduction beam, N is the refractive index of the substrate). Where, for example, the wavelength of the reproduction beam is 780 nm, the pit depth becomes 780 nm$\div 1.58 \times 4 = 123$ nm if the refractive index (for example, 1.58) of the substrate is taken into consideration, and the largest amplitude at this time is obtained. As the laser spot follows the recording pit track of an actual optical disk, the depth is approximately 100 nm, considering the tracking performance.

The size of a recording pit is considered, since the largest diffraction effect is obtained when the reflected quantity of light from, the recording pit and the reflected quantity of light from the periphery thereof are approximately the same.

The present invention is observed with respect to this point. The reflection index of the interior of the recording pit is made higher than the reflection index of the periphery so that a higher density is achieved. That is, the reflection index of the interior of the recording pit is made higher than the peripheral reflection index so that the reflected quantity of light from the recording pit can be made approximately the same as the reflected quantity of light from the periphery thereof using relatively small recording pits. A same signal amplitude as before is obtained from a smaller recording pit than before, using the same laser spot diameter, so that a signal reproducing operation from a medium recorded at a higher density can be effected.

The present invention is suitable for the erasable type of optical disk as will be described hereinafter.

A representative construction example of the recording medium of the present invention is shown in FIG. 7. A laser beam for effecting the recording, reproducing and erasing operations is incident from the side of a substrate 13.

Resin such as PMMA, polycarbonate or the like, or smooth surface items such as glass or the like is used as a substrate 13. In the case of the optical disk, the normal substrate plane 20 includes a spiral track for guiding the laser beam which is formed by a continuous groove (track) or concave and convex pits or the like.

Protective layers 14, 16 are formed of a material which physically and chemically stable, namely, has a higher melting point and softening temperature than that of the recording material and does not adversely interact with the recording material. Such layers 14, 16 are composed of dielectrics of, for example, $Al_2O_3$, $SiO_x$, $Ta_2O_5$, $MoO_3$, $WO_3$, $ZrO_2$, ZnS, $AlN_x$, Bn, $SiN_x$, TiN, ZrN, $PbF_2$, $MgF_2$ or the like or combinations thereof. The protective layers need not be transparent, and may be composed of ZnTe having a light absorbing property with respect to, for example, visual light and infrared rays. The protective layers 14, 16 which are composed of different materials, have advantages in that the degree of freedom in designing the optical disk is larger. Of course, the layers 14, 16 may be composed of the same material.

The recording film 15 is composed of a material which reversibly changes between a crystal state and non-crystalline state, for example, an optical phase change material in which Te or In, Se or the like is a principal component. Te-Sb-Ge, Te-Ge, Te-Ge-Sn, Te-Ge-Sn-Au, Sb-Se, Sb-Te, Sb-Se-Te, In-Te, In-Se, In-Se-T1, In-Sb, In-Sb-Se, In-Se-Te or the like are examples of principal components of a well known optical phase change material. These films are normally formed in a non-crystalline state, and laser beam energy or the like are applied to obtain a crystal state and change optical constants (refractive index n, extinction coefficient k).

A reflection layer 17 is made of metallic elements such as Au, Al, Cu, Ni, Cr and so on, or an alloy thereof, and functions to improve the optical absorbing efficiency into the recording film. However, if the recording film 15 is made sufficiently thick so as to improve the optical absorbing efficiency, the reflection layer 17 may not be necessary. The optical absorbing efficiency can be improved as a whole, if the film thickness per the recording film layer is thin, by employing a plurality of recording films and protective layers alternating in a stacked construction.

The protective substrate 19 is formed of resin spin coated resin, of a pasting operation of a resin plate similar to the substrate, glass plate or metallic plate and so on with the use of a bonding agent 18. It may be constructed to be recorded, reproduced, or erased from both sides by employing a pasting operation of two recording media units using a bonding agent and an intermediate substrate.

The recording film and the protective layer are normally formed using an electron beam evaporation method, a sputtering method, an ion plating method, a CVD method, a laser sputtering method or the like.

The recording film 15 is formed of such thickness as one portion of an incident light ray can transmit through the recording film 15 even at a time when the recording film 15 is in a crystal state. A transmission index is considered when the optical phase change material film (crystalline phase) is grasped with protective layers (thickness is assumed as infinite) of the same material quality as the dielectric film layers 14, 16. It is important to select the film thickness so that such a value may be at least 1% or more, preferably about 2 through 3% or more. The component to be re-incident into the recording film 15 is removed by reflection with the reflection layer 17 and an interference effect of the light becomes smaller. It becomes difficult to control the optical path length, reflection index of the whole medium, the absorption in the recording film and so on if the film thickness of the second dielectric film layer 16 and the reflection layer 17 is somewhat varied.

FIG. 8 shows the relation between the film thickness and the transmission index (wavelength 780 nm) when $Ge_2Sb_2Te_5$ is grasped with a $Zns-SiO_2$ mixture ($SiO_2$:20 molar %) film as a representative recording film composition. It is apparent from the drawing, in the case of the crystal state, that the transmission index is 1% or more if the film thickness is 60 nm or lower, 2% or more if it is 50 nm or lower, 3% or more if it is 40 nm or lower.

The film thickness of the first and second protective layers 14, 16 is determined as follows. The complex refractive index of a material for constructing each layer is obtained using a normal method (for example, a method in which a film is formed on a glass plate, and a value of film thickness, reflection index, and transmission index is measured, or a method in which an elipso meter is used). Then, the film thickness of the first and second dielectrics is obtained by calculation using a matrix method (for example, see chapter 3, 1971, IWANAMI SHOTEN, "Surge Optics" written by Hiroshi KUBOTA) with the recording film 15 and a reflection layer 17 being fixed in thickness. Concretely, the incoming and outgoing optical energies are calculated in accordance with an energy preservation rule with respect to all surfaces with a film thickness of each respective layer being assumed. Namely, an equation of the incoming and outgoing energies with regard to the respective surfaces in the multi-medium is established. The optical path length with respect to the incident beam (actually the wavelength $\lambda$ to be used for the reproduction of the information), the intensity of the transmission beam, the intensity of the reflection beam and the absorption quantity at each layer can be obtained with the solution of the obtained simultaneous equations. By such calculation, in either the crystal state of the recording film and an amorphous state, the structural phase difference of the reflection beam of the non-recorded region (normal crystal state) and the recorded mark region (normal non-crystalline state) with respect to the reproduction beam of the wavelength $\lambda$, the reflection index change $\Delta R$ between both regions and the absorption difference of both regions in the recording film can be known. In the present invention, the range of the structural phase difference of the reflection beam between two conditions is (0.5 through 1.5) $\pi + 2 n\pi$ radians n: integer and the reflection index R1 of the recording mark region is made larger than the reflection index R2 of the non-recording region with respect to the wavelength $\lambda$ of the laser beam for reproducing the recorded information. If the structural phase difference between both regions is (0.5 through 1.5) $\pi + 2 n\pi$ radians n: integer structural phase difference reproduction can be sufficiently realized. As the R1 of the reflection index of the recording mark is larger than the reflection index R2 of the non-recorded region, the area of the recording mark for causing the optimum structural phase difference reproduction becomes smaller than in the case of R1≦R2 or R1=R2. FIG. 9 shows a model thereof.

In FIG. 9, in the left column is shown conventional construction in which a phase difference between the record mark of non-crystalline state and the non-record portion is $\pi$, and both reflection rates R1 and R2 are the same. Upon comparison between the dimensions of a record mark shape and a range of applying the reproducing light, the view of the upper portion of the left column shows the dimensions of a record mark in which the phase difference light is generated at the highest efficiency. In this case, the amplitudes of reflection light between the reproducing light from the record mark and the reproducting light from the periphery of the record mark are the same, and the interference between them becomes maximum. If the record mark becomes smaller than the shape of the most suitable mark as shown in the lower left column, the amplitude of reflection light from the periphery of record mark becomes larger than that of reflection light from the record mark, and the interference effect between the reflection lights is insufficient, resulting in the signal amplitude between the record portion and non-record portion becoming small. On the other hand the right column of FIG. 9 shows a novel construction of the present invention having a phase difference $\pi$ between the record mark and non-record portion, in which the reflection rates R1 and R2 are defined as R1>R2. At this time, the dimension of the record mark for generating the phase difference reproduction at the highest efficiency is smaller than the record mark generated in the conventional construction. If the dimension of record mark having the construction of the present invention is designed with the same dimension of the record mark in the conventional construction which can generate the phase difference reproduction at the highest efficiency as shown in the upper left column, the amplitude of reflection light from the record mark becomes larger than that of the reflection light from the periphery of the record mark, and the interference effect between the reflection lights is so insufficient that the signal amplitude between the record portion and non-record portion becomes small.

Whether the recording medium is made as designed can be verified through comparison between precalculated values and measurements, obtained using a spectrum meter, of the reflection index and the transmission index of the medium. Although the absorption with the recording film and the absorption with the reflection layer cannot be measured directly, the accuracy can be improved by carrying out the same comparison using 2 wavelengths or more. The structural phase change amount of the recorded portion and the non-recorded portion can be obtained by observation, using an interference film thickness meter or the like, of the manner in which interference stripes of light of a wavelength which is the same as the wavelength of the reproduction beam are shifted between the recording portion and the non-recording portion.

Embodiments of the present invention will be fully described hereinafter.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1 is a cross sectional view and a plane view showing exemplary construction of a first embodiment of the present invention;

FIG. 9 is a chart for explaining the relation between the size of the reproduction beam focused on the recording film and the shape of the recording mark so as to cause the optimum structural phase difference reproduction;

FIG. 10 is a view showing a method of measuring the structural phase difference of a sample;

DETAILED DESCRIPTION OF THE INVENTION

Figure 2:
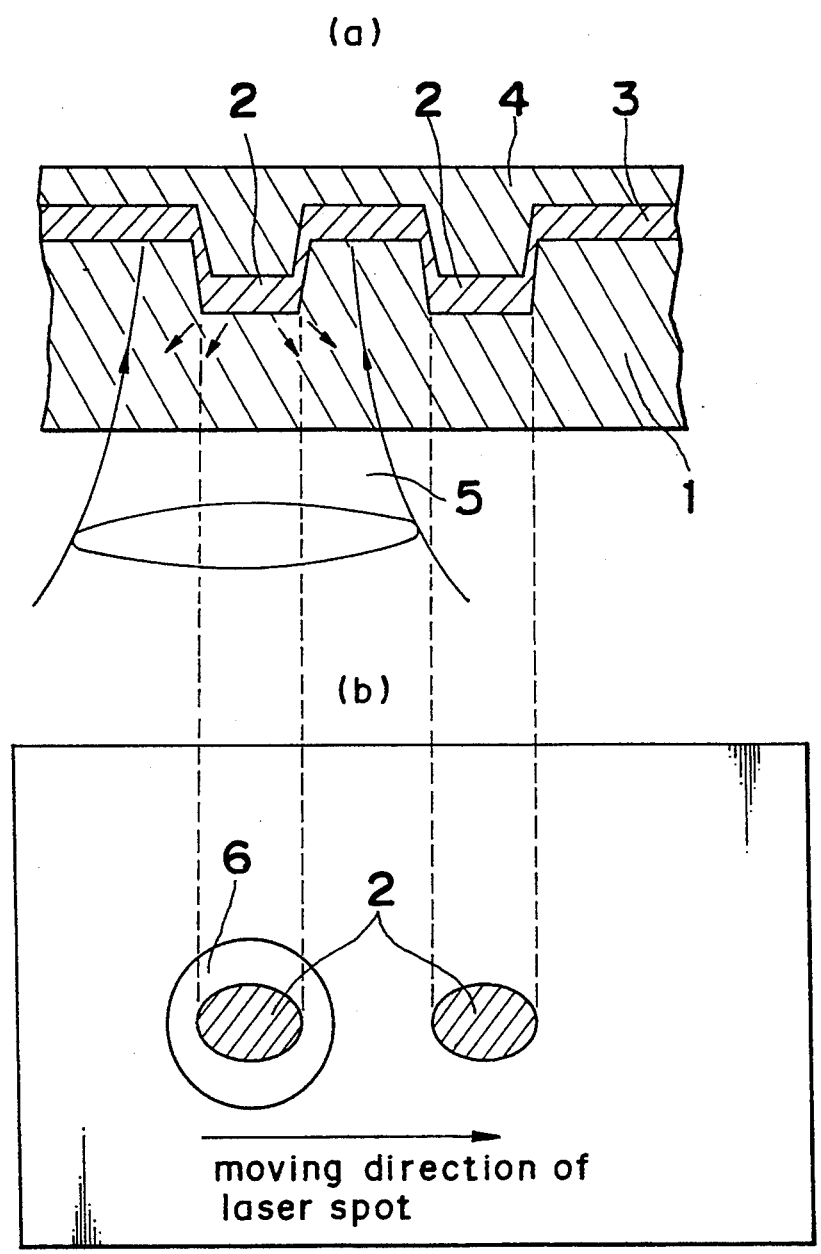
FIG. 2 is a cross sectional view and a plane view showing an exemplary construction of the conventional embodiment.

Before the description of the present invention proceeds, it is to be noted that like parts are designated by like reference numerals throughout the accompanying drawings.

Embodiment 1

FIG. 1 shows a sectional view in one embodiment of an optical disk construction in accordance with the present invention. A substrate 7 is a polycarbonate substrate which is 120 mm in diameter and 1.2 mm in thickness. A recording pit 9 approximately 330 nm in depth is formed on the substrate 7 surface, and further a reflection layer 8 made of Au is provided. The present disk is characterized in that the film thickness of the reflective layer in the recording pit interior portion is larger than that of the periphery thereof.

Figure 3:
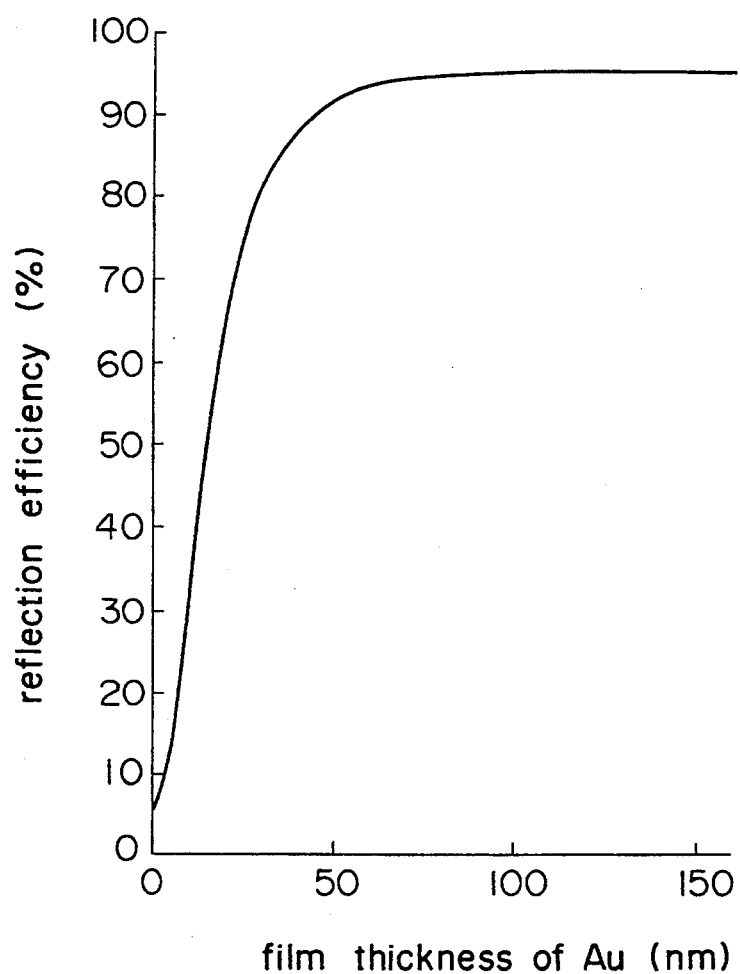
FIG. 3 is a graph showing the relation between the film thickness of Au and reflection index when the Au film has been formed on a polycarbonate substrate.

FIG. 3 shows the relation between the film thickness of Au and the reflection index in the wavelength 780 nm when an Au film is formed on a plane shaped polycarbonate substrate. As the film thickness of Au becomes larger, the reflection index increases monotonously. In the present embodiment, in order to raise the reflection index of the recording pit interior higher than that of the periphery thereof, the film thickness of the recording pit interior is selected to be 45 nm (reflection index being approximately 90%), the film thickness of the recording pit periphery is 13 nm (reflection index being approximately 45%). Au of a non-uniform thickness is formed on the substrate such that the film thickness of the Au film is different on the inside and outside of the recording pit. This can be achieved by continuously applying an ion beam or the like at an angle of preferably 30° or lower in an oblique direction of the substrate so as to etch the Au film. The etching rate of the pit interior can be made lower than the etching rate of the pit exterior since the pit interior is shadowed by the pit walls relative to the obliquely incident beam. The thickness of the Au film can thus be varied inside and outside of the pit. Although the pit depth of the substrate is often set near $\lambda/4N$ ($\lambda$: the wavelength of the reproduction beam, N: refractive index of the substrate) in the normal ROM disk, it is effective in the present invention to set the pit depth to approximately $3\lambda/4N$ so that the shadow may be sufficiently formed with respect to the incident beam during the etching operation. It is important to rotate the substrate during the etching operation so that the incident direction of the etching beam is not constantly fixed with respect to the substrate.

In order to check the signal reproduction characteristics of such an optical disk, an optical disk in which the length of the recording pits varied was made, with the pit of the recording pits being 2 $\mu$m, so as to check the relationship of the length of the recording pit and the reproduction signal. An optical disk in which the film thickness of an Au reflection layer was uniformly 45 nm was made, for comparison of the conventional embodiment, so as to obtain the reproduction characteristics. The laser wavelength of the signal reproduction apparatus was a constant 780 nm, and 5 m/s relative speed of the laser beam and the optical disk was employed.

Figure 4:
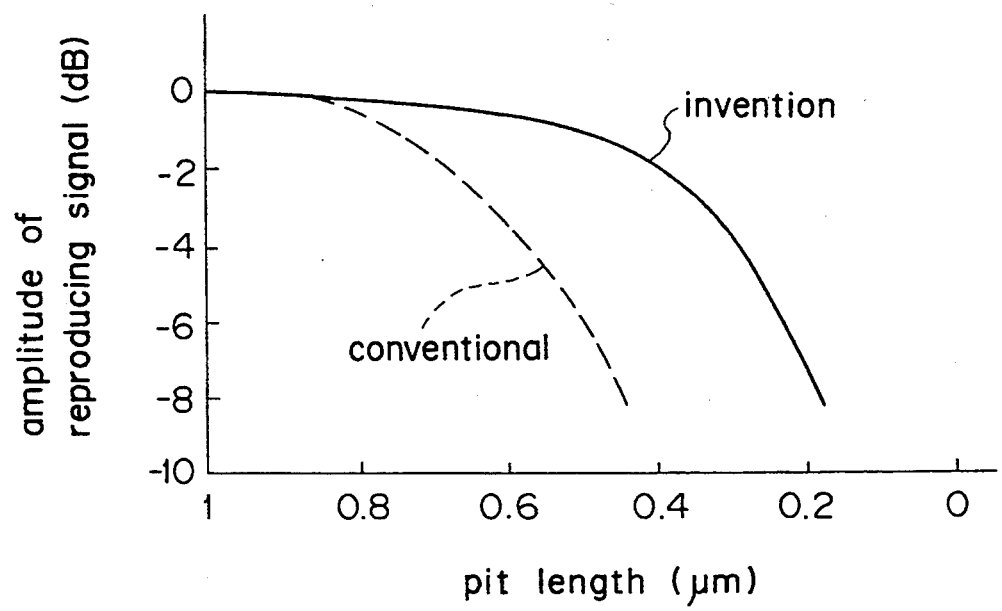
FIG. 4 is a graph showing the recording pit length dependence of the reproduction signal amplitude in the construction of the first embodiment.

FIG. 4 shows the recording pit length dependence of the reproduction signal amplitude. The reproduction signal amplitude is standardized at 0dB where the recording pit length is 1 $\mu$m. As shown, the reproduction signal amplitude abruptly becomes smaller as the recording pit length becomes shorter in the conventional construction, whereas in the optical disk of the present invention a large reproduction signal amplitude is obtained even for smaller length recording pits.

Since the same reproduction signal level as in the conventional embodiment is obtained from recording pits in accordance with the present invention, a higher recording density is obtained.

Although Au is adopted as the reflection layer material in the present embodiment, metals such as Al, Ti, Ni, Cr, Cu, Ta and so on are an alloy thereof may be adopted.

Although, in the present embodiment, the reflection layer film of the recording pit interior is adapted to be made thicker so as to make the reflection index of the recording pit interior higher than the reflection index of the periphery thereof, it is possible to adopt a different reflection layer material in the interior of the recording pit and in the periphery thereof. Similar effects can be obtained in which, for example, the recording pit interior is Au at 50 nm (approximately 93% in reflection index) and the periphery thereof is NiCr at 50 nm (approximately 55% in reflection index).

Embodiment 2

Figure 5:
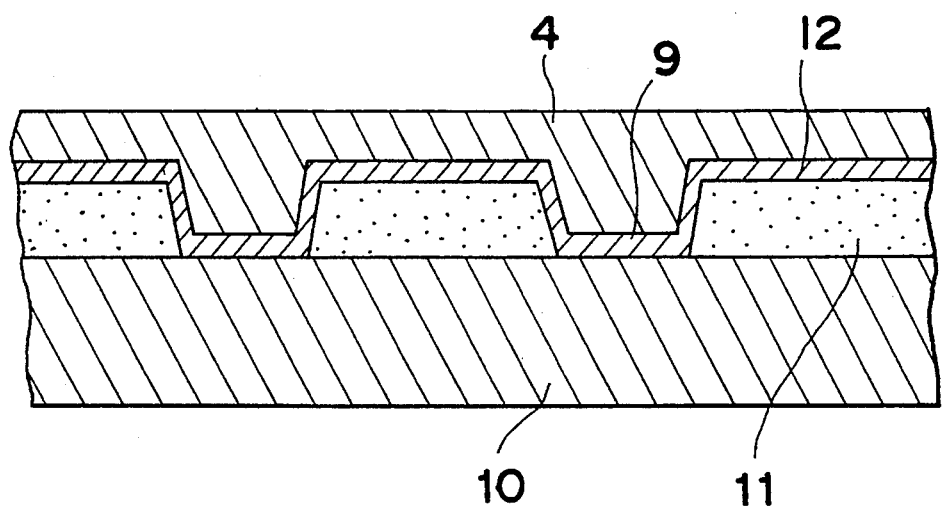
FIG. 5 is a cross sectional view showing an exemplary second construction in accordance with the present invention.

FIG. 5 shows a recording medium of another construction in accordance with the present invention. The substrate 10 is a glass substrate of 120 mm in diameter and 1.2 mm in thickness. After the film formation of the protective layer of ZnS thereon, the recording pit 9 corresponding to a recorded signal is made by the provision of a concave portion in the ZnS film 11. In order to make the concave portion, a method is adopted of coating a photoresist on the ZnS film 11, exposing the ZnS film 11 using a laser beam modulated with the recording signal, thereafter removing corresponding portions of the photoresist, further removing the ZnS using a dry etching operation. An Au film is formed thereon, with a homogeneous film 4, and is provided as a reflection layer 12. The film thickness is 56 nm for ZnS, and 14 nm for Au. In the wavelength 780 nm of the medium, the reflection index of the recording pit interior is approximately 50%, the reflection index of the recording pit periphery is approximately 32%, or the structural phase difference of the reflection beam of the recording pit interior and the periphery thereof is approximately $\pi$.

The same experiment as the embodiment 1 was carried out in order to check the signal reproduction characteristics of the optical disk. The recording pit interval was made constant at 2 $\mu$m, and an optical disk having recording pits of different length was made so as to check the relation between the lengths of a recording pit and the reproduction signal amplitude. The laser wavelength of the signal reproduction apparatus was made constant at 780 nm, and the relative speed of the laser beam and the disk was 5 m/s.

Figure 6:
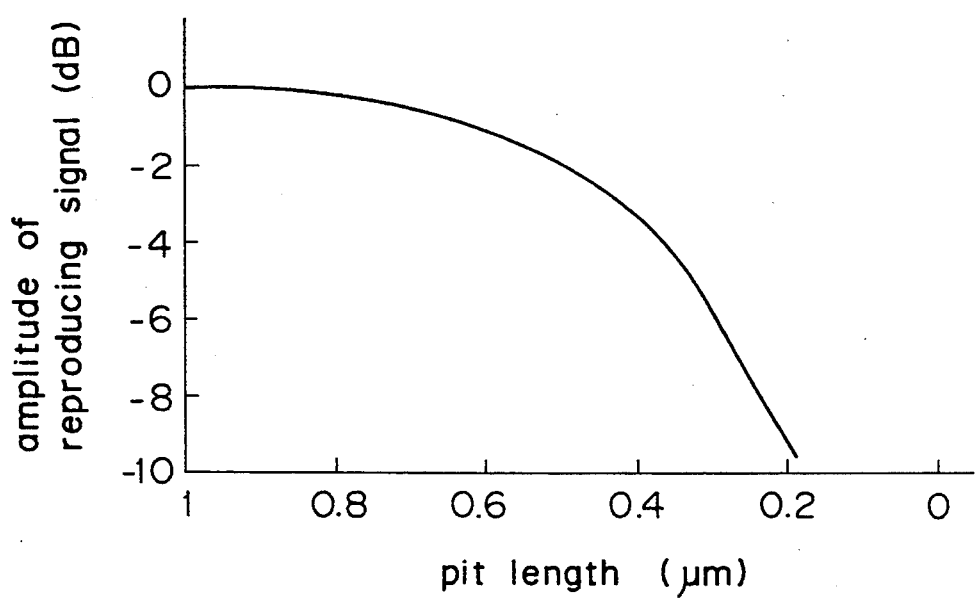
FIG. 6 is a graph showing the recording pit length dependence of the reproduction signal amplitude in the construction of a second embodiment.

FIG. 6 shows the relationship between recording pit length and the reproduction signal amplitude. The reproduction signal amplitude is standardized at a 0dB value where the recording pit length is 1 $\mu$m. Even in this case, it is apparent that a large reproduction signal amplitude is obtained even with respect to a recording pit of small length as in the embodiment 1, thus allowing for higher density recording.

Although the layer of ZnS is described above as being etched to the substrate in the present embodiment, device may be constructed such that ZnS remains within the pit after the etching, i.e., the etching ceases before reaching the substrate.

Embodiment 3

$Ge_2Sb_2Te_5$ has been selected as a representative recording film composition. The $Ge_2Sb_2Te_5$ is known as a material by which superior recording and erasing characteristics, and rewriting characteristics, are obtained (Japanese Patent Laid-Open Publication No. 62-209742.)

Figure 7:
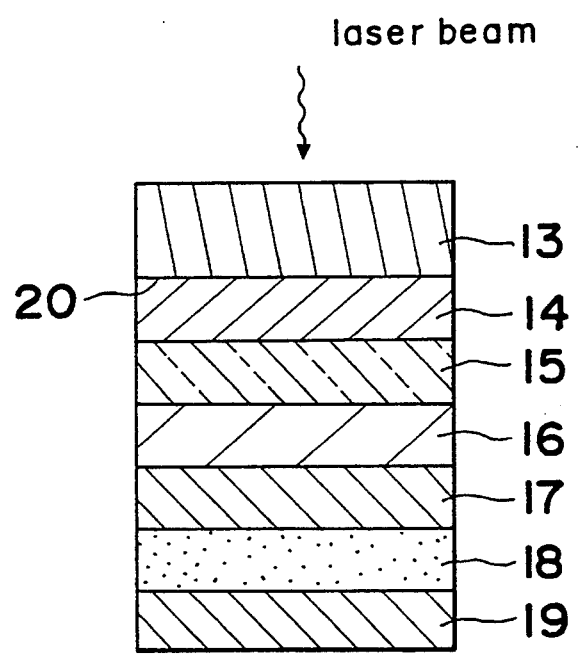
FIG. 7 is a cross sectional view showing an exemplary construction of the third and fourth embodiments of the present invention.
Figure 8:
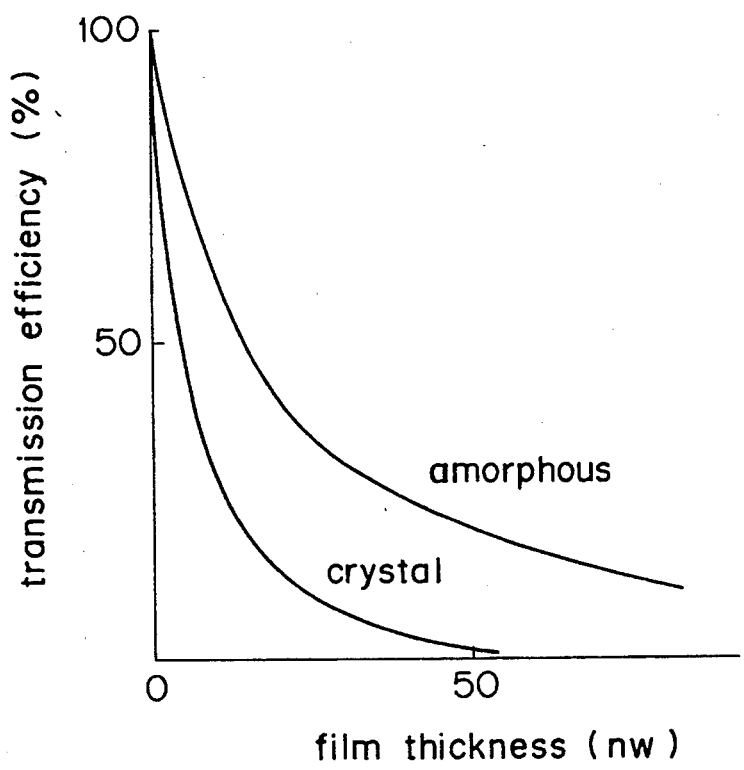
FIG. 8 is a graph showing the thickness of the recording film for constructing the recording medium, and the transmission index in the embodiment of the present invention.

FIG. 7 shows a disk construction in one embodiment of the present invention. The material quality of the substrate is smooth polycarbonate which is not provided with grooves. The disk is sandwiched in a dielectric protective layer composed of ZnS-20 mol % on both the sides thereof with the film thickness of the recording film being 15 nm. Gold (Au) is used for a reflection layer material and the film thickness is 51 nm. Table 1 shows optical constants with respect to 780 nm wavelength.

TABLE 1

| Material Quality | Optical Constants (Refractive Index N, Extinction Coefficient k) | |
| --- | --- | --- |
| Polycarbonate | 1.58 | 0.0 |
| ZnS-20 mol % $SiO_2$ | 2.10 | 0.0 |
| $Ge_2Sb_2Te_5$ (Non-Crystalloid) | 4.52 | 1.30 |
| $Ge_2Sb_2Te_5$ (Crystal) | 5.51 | 3.40 |
| Au | 0.18 | 4.64 |

Table 2 shows the film thickness of the substrate side protective layer, the film thickness of the reflection layer side protective layer, the reflection index R1 in the non-crystalline state, the reflection index R2 in the crystal state, and the structural phase difference between both states with regard to some samples taken from among samples used in experiments. The optical characteristics are with respect to the wavelength 780 nm.

The actual measurement values of the reflection index are obtained with the use of a spectro-photometer. The crystallizing processing operation is effected in nitrogen for ten minutes at 250° C. A measuring method of the structural phase difference of the sample will be described hereinafter. One portion region of the sample piece is crystallized with semiconductor laser and is made up of the non-crystalline region and the crystal region in adjacent relation. Then, interference stripes are formed using the multiple interference method. The interference stripes of the light (here 780 nm) of a wavelength which is the same as the reproduction beam are made on the sample, with, for example, the use of a Michelson interference film thickness meter. The interference stripe pattern is photographed with the use of infrared ray film. When the structural phase difference is provided between both regions, the interference stripes are not made linear, thus causing a discontinuous stage difference as shown in FIG. 10 in the boundary portion. A structural phase difference is obtained from the shift amount $l_1/l$. It is found out that a sample which is approximately designed is obtained.

TABLE 2

| Sample No. | Substrate side Film Thickness | Reflection Layer Side Film Thickness | R1 (%) Design/ Actual Measurement | R2 (%) Design/ Actual Measurement | Structural Phase Difference Design/ Actual Measurement |
| --- | --- | --- | --- | --- | --- |
| 1 | 116 nm | 23 nm | 7/8 | 7/7 | 0.84 $\pi$/0.8 $\pi$ |
| 2 | 116 nm | 35 nm | 7/7 | 8/7 | 1.14 $\pi$/1.0 $\pi$ |
| 3 | 116 nm | 58 nm | 14/13 | 11/10 | 1.50 $\pi$/1.5 $\pi$ |
| 4 | 174 nm | 12 nm | 4/4 | 20/22 | 0.50 $\pi$/0.5 $\pi$ |

Figure 11:
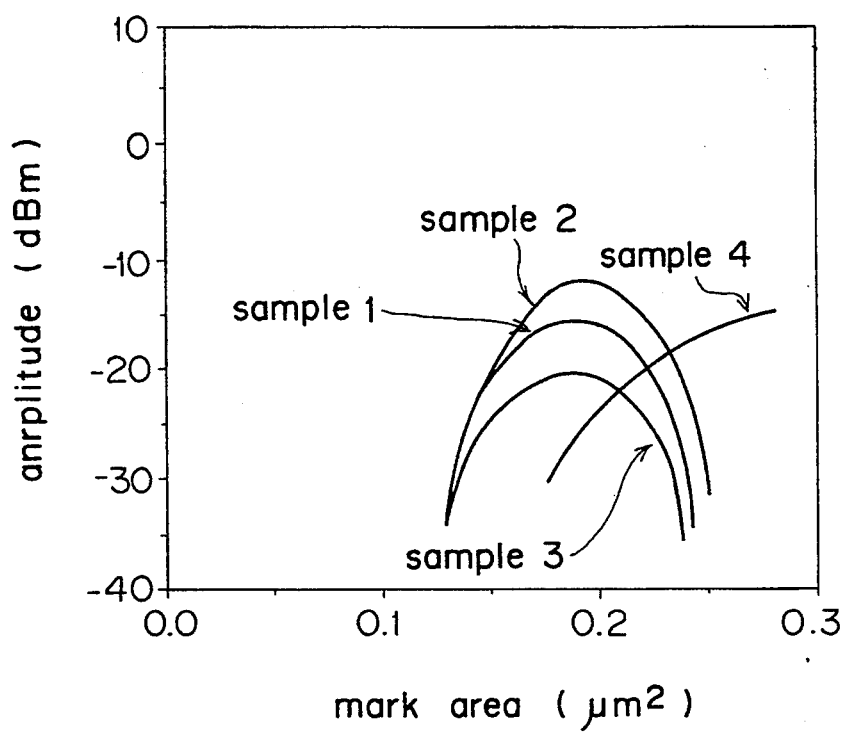
FIG. 11 is a graph showing the relation between the recording mark area and the reproduction amplitude.

An initializing (crystallizing) processing operation is effected on the whole recording film face by an initializing apparatus using an Ar laser in advance upon these media. Thereafter, the medium is rotated at a linear speed of 10 m/s so as to apply the semiconductor laser beam of 780 nm wavelength which is focused on the recording film by a lens system having a 0.5 aperture number. Light modulated at a 50% modulation degree and 10 HMz single frequency with various power is applied upon the recording film face so as to effect a recording operation while the recording film is partially non-crystallized, and applying a continuous output of 1mW for detecting the reflection beams with a photodetector to reproduce it. As a result, the reproduction signal amplitude is observed. The recorded/reproduced disk is dismantled and the shape of the recording mark is checked with the use of a transparent electronic microscope. The shape of the recording mark differs with recording power. FIG. 11 shows the relation between the recording mark area and the reproduction amplitude in each sample. The following may be observed from FIG. 11:

1) As is clear from the comparison between the samples 3 and 4, the structural phase difference between the non-crystalline portion and the crystal portion, which is closer to the $\pi$, can take a larger maximum signal amplitude in the case of the same reflection index. The area to be obtained in the maximum signal amplitude is the same in both of the samples.

2) As is clear from the comparison of the samples 3 and 4, in the sample 3 a larger signal amplitude can be obtained with a smaller mark shape as compared with the sample 4 (reflection index of the crystal portion is larger than the reflection index of the non-crystalline portion). In the sample 3 the reflection index of the non-crystalline portion is larger than the reflection index of the crystal portion when there is equivalently the same structural phase.

The following may be observed from the relation between the structural phase difference between the non-crystalline region of the recording medium and the crystal region, and the relation of the reflection indexes of both thereof:

1) The largest signal amplitude is obtained when the structural phase difference is $(1+2n) \pi$ radians (n is integer) if samples having the same reflection index are compared. If the structural phase difference is in a range of $(0.5$ through $1.5) \pi + 2$ n$\pi$ radians, a signal amplitude is approximately 60% or more of the maximum signal amplitude when the structural phase difference is $(1+2n) \pi$ radians. This is a sufficiently practical value. The signal amplitude becomes extremely small at a structural phase difference of $(1.5$ through $2.5) \pi + 2$ n$\pi$ radians.

2) The samples having the same reflection index in the crystal condition are compared in the range of $(0.5$ through $1.5) \pi + 2$ n$\pi$ radians in structural phase difference and in the same structural phase difference. As the reflection index of the non-crystalline portion becomes higher than the reflection index of the crystal portion, the area of the recording mark where the maximum amplitude is obtained becomes small. At this time, the value of the maximum amplitude is not known. The reflection index of the non-crystalline portion is made higher in construction than the reflection index of the crystal portion so as to raise the recording density. Since the difference of the reflection index of the crystal and the non-crystalloid is larger, a larger signal amplitude is obtained with respect to small recording mark. The signal amplitude becomes maximum when the phase difference is $(1+2n) \pi$ radians. When the reflection index of the non-crystalloid is 1.2 times the reflection index of the crystal, the area of the recording mark showing the same maximum signal amplitude becomes approximately 95% as compared with a case of both reflection indexes being the same, and substantially contribution towards the higher density is small. When the reflection index of the non-crystalloid is 1.3 times the reflection index of the crystal, the area of the recording mark showing the same maximum signal amplitude becomes approximately 80 percent as compared with both reflection indexes being the same, thus showing sufficient contribution towards higher density.

When the reflection index R2 of the crystal condition is too small, the amplitude of the reproduction signal becomes too small. When the reflection index R2 in the crystal state becomes too large, the optical absorption quantity in the recording film becomes smaller, and the sensitivity becomes extremely low. It is found through various experiments that no problems are caused when R2 is made 8% or larger and 60% or smaller.

3) The samples having the same reflection index of the crystal state are compared in the range of (0.5 through 1.5) $\pi + 2\ n\pi$ radians in structural phase difference and in the same structural phase difference. As the reflection index of the non-crystalline portion is higher than the reflection index of the crystal portion, the number of repeated recording and erasing operations increases.

4) A recording mark of the same area is formed, and thereafter varying power is continuously applied to crystallize the recording mark and to erase the signals. The erasing index is measured. The samples having the same reflection index of the crystal state are compared in the range of (0.5 through 1.5) $\pi + 2\ n\pi$ radians in structural phase difference, and in the same structural phase difference. As the reflection index of the non-crystalline portion is higher than the reflection index of the crystal portion, it is found that the range of the erasing power which becomes an erasing index (for example, $-20$ dB) of the constant erasing index or more is spread, namely, the erasing power range is spread.

The composition range of the recording film is spread, and the crystallizing and non-crystallized sensitivity, and rewriting characteristics are all improved. In the structural phase difference reproduction, such disk construction is checked as the recording density, the erasing characteristics, and the recording and erasing repetition characteristics may be improved by a higher reflection index of the non-crystalline portion than the reflection index of the crystal portion. A construction n which, as the result of experiments, the crystallizing and non-crystallizating are both improved (heating time necessary for crystallization is 100 nsec or lower, considering the superposed writing with a single beam), and improved recording and erasure repetition characteristics are obtained, exists when the composition range of the Ge-Sb-Te principal components is $$(Ge)\ x\ (Sb)\ y\ (Te)\ z$$

$$0.10 \leqq x \leqq 0.35\ \ 0.10 \leqq y$$

$$0.45 \leqq z \leqq 0.65\ \ x+y+z=1$$

Figure 12:
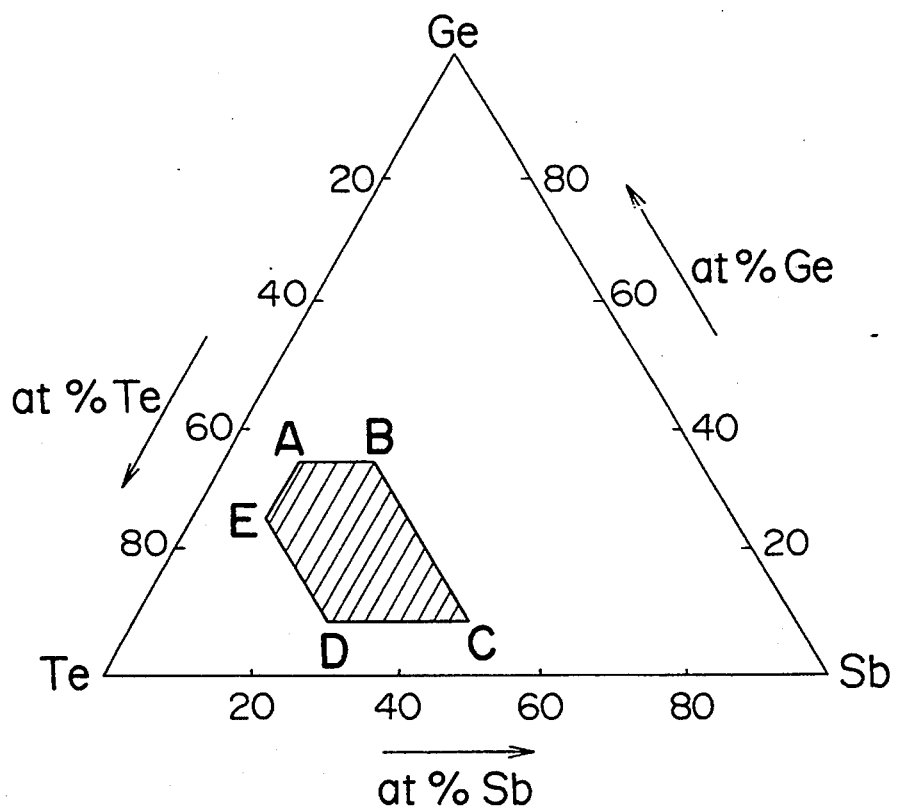
FIG. 12 is a chart showing the range of the principal component of the recording film with Ge-Sb-Te being principal components.

The composition range of the Ge-Sb-Te principal components is a range surrounded by points A, B, C, D, E of FIG. 12.

The Ge-Sb-Te composition range of the recording film principal components is checked in further detail. The recording film composition of a range to be represented by $$(Ge_2Sb_2Te_5)\ x\ (GeSb_2Te_4)\ 1-x$$

$$0 \leqq x \leqq 1$$

is especially fast in crystallizing speed, and at the same time, the recording and erasing repetition characteristics are improved. In the recording medium having the recording film of such compositions, combined with other effects the present invention, result in an even higher recording density.

When the thickness of the recording film is experimentally checked with respect to the recording and erasing repetition characteristics, improved repetition characteristics cannot be obtained unless the recording film thickness is 40 nm or lower in the case of the disk construction having the recording film of Ge-Sb-Te as principal components. The film thickness tolerance of each layer where the effect of the present invention is obtained in the construction of the disk becomes extremely narrow when the recording film thickness is 30 nm or more. Actual fabrication becomes difficult. The most effective structural phase difference reproduction can be effected when $(1+2n)\ \pi$, and the reflection index of the recording portion is larger than the reflection index of the non-recording portion, if a substrate without grooves is used in either recording film composition. If the structural phase difference is in the range of (0.5 through 1.5) $\pi + 2\ n\pi$ radians, a signal amplitude is approximately 60 percent or more of the maximum signal amplitude when the structural phase difference is $(1+2n)\ \pi$ radians. This is a sufficiently practical value. In the structural phase difference of (1.5 through 2.5) $\pi + 2\ n\pi$ radians, the signal amplitude becomes extremely small. As the structural phase is caused with grooves in the substrate having grooves, it does not mean that the maximum structural phase difference reproducing amplitude is obtained when the structural phase difference between the recording portion and the non-recording portion is certainly $(1+2n)\ \pi$ radians. The structural phase difference between the optimum recording portion and the non-recording portion can be determined considering the groove shape (groove interval, groove width, groove depth and so on) at this time. It is found that the structural phase difference between the recording portion and the non-recording portion need only be within (0.5 through 1.5) $\pi + 2\ n\pi$ radians. When samples having the same reflection index of the crystal state are compared with the structural phase difference being in the range of (0.5 through 1.5) $\pi + 2\ n\pi$ radians, and the structural phase difference being the same, the area of the recording mark where the maximum amplitude is obtained becomes small as the reflection index of the non-crystalline portion is higher than the reflection index of the crystal portion. At this time, the value of the maximum amplitude is not known. This means that the reflection index of the non-crystalline portion is made higher than the reflection index of the crystal portion so as to improve the recording density. As the difference of the crystal and non-crystalline reflection indexes is larger, a large signal amplitude is obtained with respect to smaller recording marks. When the reflection index of the non-crystalloid is 1.2 times the reflection index of the crystal, the area of the recording mark showing the same maximum signal amplitude becomes approximately 95 percent as compared with both reflection indexes being the same, and substantial contribution with respect to high density recording becomes small. When the reflection index of the non-crystalloid is 1.3 times the reflection index of the crystal, the area of the recording mark showing the same maximum signal amplitude becomes approximately 80 percent as compared with both reflection indexes being the same, showing sufficient contribution towards high density recording. When the reflection index of the non-crystalloid is twice the reflection index of the crystal, the area of the recording mark showing the same maximum signal amplitude becomes approximately 60 percent as compared with both the reflection indexes being the same, showing even larger contribution towards the higher density recording.

The samples having the same reflection index of the crystal state with the structural phase difference being in the range of (0.5 through 1.5) $\pi + 2$ n$\pi$ radians, and the structural phase difference being the same. The reflection index of the non-crystalline portion is higher than the reflection index of the crystal portion, and wider erasing characteristics and superior erasing power tolerance are obtained. At the same time, improved repetition frequency of recording and erasing is obtained. It is found out that the noise component of the medium during reproduction becomes smaller with the reflection index of the crystal state (non-recording condition) being made as small as possible. Suppose the reflection index of the crystal condition (non-recording condition) is made too small, and the signal amplitude becomes small. It is found, in the actual evaluation of the C/N of the signal, that the effect of becoming smaller in the noise component is larger than the ratio of reducing the signal amplitude by the smaller reflection index of the crystal state. It is found from the various recording film materials and the various disk compositions that a superior reproduction signal quality is obtained if the reflection index at the time of crystal is restrained to 15% or lower. At this time, the structural phase difference between the recording portion and the nonrecording portion is set in the range of (0.5 through 1.5) $\pi + 2$ n$\pi$ radians, or the reflection index of the recorded portion is set larger than the reflection index of the nonrecorded portion.

Embodiment 4

$Sb_2Se_3$ is known as a recording film composition having superior recording and erasing characteristics. The optical constant of the $Sb_2Se_3$ film is disclosed in, for example, Japanese Patent Laid-Open Publication No. 2-266978. The structural phase change recording medium is optically designed and a sample disk is made with reference to the optical constants of the $Sb_2Se_3$ film disclosed herein.

The construction of the sample disk made in FIG. 7 is shown. The material quality of the substrate is made of smooth polycarbonate without grooves. Both sides of the recording thin film are sandwiched with a dielectric protective layer composed of ZnS-20 mol % $SiO_2$. Gold (Au) is used for reflection layer material. The formation of each layer is provided by a sputtering method. Table 3 shows optical constants (actual measurement values) of each layer with respect to 780 nm in wavelength.

TABLE 3

| Material Quality | Optical Constants (Refractive Index N, Extinction Coefficient k) | |
| --- | --- | --- |
| Polycarbonate | 1.58 | 0.0 |
| ZnS - 20 mol % $SiO_2$ | 2.10 | 0.0 |
| $Sb_2Se_3$ (Non-Crystalloid) | 3.00 | 0.15 |
| $Sb_2Se_3$ (Crystal) | 4.70 | 0.70 |
| Au | 0.18 | 4.64 |

When the $Sb_2Se_3$ film is used for the recording film, such a disk construction can be found in which the reflection index of the recorded portion becomes three times or more the reflection index of the non-recorded portion with the structural phase difference being made larger. Assume that the film thickness of the ZnS-20 mol % $SiO_2$ protective layer on the substrate side is 104 nm, the film thickness of the recording film is 160 nm, the film thickness of the SnS-20 mol % $SiO_2$ protective layer on the reflection layer is 35 nm, the film thickness of the Au reflection layer is 50 nm, the structural phase difference between the recording portion and the non-recording portion is 0.9 $\pi$ radians, the reflection index of the recording portion is 30%, and the reflection index of the nonrecording portion becomes 10%. In such a disk, a large signal amplitude is obtained even in the case of a small recording mark. When $Sb_2Se_3$ is used in the recording film, the phase difference reproducing construction recording medium of a higher degree of freedom can be made.

For example, Table 4 shows the example of the sample construction and the optical characteristics (actual measurement value) of the sample. The recording film thickness at this time is 120 nm, the reflection layer is made of Au and is 50 nm in film thickness. The structural phase difference is equal to 0.9 $\pi$ radians in all the samples No. 5 to No. 8, but the reflection index (R1) at the non-crystalloid state/the reflection index (R2) at the crystal state are respectively 1.0, 1.2, 1.3, 2.1.

TABLE 4

| Sample No. | Substrate Side Film Thickness | Reflection Layer Side Film Thickness | R1 (%) | R2 (%) | R1/R2 | Structural Phase Difference |
| --- | --- | --- | --- | --- | --- | --- |
| 5 | 128 nm | 116 nm | 38 | 37 | 1.0 | 0.90 $\pi$ |
| 6 | 52 nm | 58 nm | 38 | 32 | 1.2 | 0.86 $\pi$ |
| 7 | 58 nm | 58 nm | 40 | 30 | 1.3 | 0.90 $\pi$ |
| 8 | 81 nm | 58 nm | 48 | 23 | 2.1 | 0.88 $\pi$ |

An initializing (crystallizing) processing operation is applied upon the whole face of the recording film in advance by an initializing apparatus using Ar laser. Semiconductor laser beams of 780 nm in wavelength are focused with a lens system having a 0.5 aperture number upon the recording film, while the medium is being rotated at a linear speed of 10 m/s. Beams modulated with a single frequency 10 MHz modulation degree of 50% are applied with various power on the recording film face so as to partially non-crystallize the recording film for effecting a recording operation, and applies a continuous output of 1mW so as to detect a reflection beam with a photodetector for effecting a reproducing operation to measure CNR. The recorded and reproduced disk is dismantled. The shape of the recording mark is checked with the use of a transmission electronic microscope. The shape of the recording mark differs with recording power. Table 5 shows the relation between the recording mark area and the maximum CNR at a time showing the maximum CNR in each sample.

TABLE 5

| Sample No. | Maximum CNR | Area of Recording Mark Which Becomes Maximum CNR (Relative Ratio with Mark Area of Sample No. 5 Being 1) |
| --- | --- | --- |
| 5 | 52dB | 1.0 |
| 6 | 51dB | 0.95 |
| 7 | 52dB | 0.83 |
| 8 | 51dB | 0.62 |

A disk is made with the recording film thickness, the protective layer thickness, and the reflective layer film thickness being varied. Signals are recorded. The structural phase difference between the non-crystalline region of the recording medium and the crystal region, and the reflection index of both are checked as follows.

1) When samples have the same reflection index are compared, the largest signal amplitude is obtained when the structural phase difference is $(1+2n)\pi$ radians (n is an integer). If the structural phase difference is in the range of $(0.5$ through $1.5) \pi+2 n\pi$ radians, a signal amplitude is approximately 60 percent or more of the maximum signal amplitude when the structural phase difference is $(1+2n)\pi$ radians. This is a sufficiently practical value. In the structural phase difference of $(1.5$ through $2.5) \pi+2 n\pi$ radians, the signal amplitude becomes extremely small.

2) When the samples having the same structural phase difference are compared with the structural phase difference being in the range of $(0.5$ through $1.5) \pi+2 n\pi$ radians, the area of the recording mark where the maximum CNR is obtained becomes smaller as the reflection index of the non-crystalline portion becomes higher than the reflection index of the crystal portion. The value of the maximum CNR is the same at each sample. This fact means that the recording density is increased by the construction in which the reflection index of the non-crystalline portion is higher than the reflection index of the crystal portion. As the difference in the reflection index between the crystal and the non-crystalloid is larger, the large CNR is obtained with respect to a small recording mark. When the structural phase difference is $(1+2n)\pi$ radians, the maximum CNR becomes maximum. When the reflection index of the non-crystalloid is 1.2 times the reflection index of the crystal, the area of the recording mark showing the same maximum CNR becomes approximately 95 percent as compared with the case where both reflection indexes are the same, and substantial contribution towards a high recording density is small. When the reflection index of the non-crystalloid is 1.3 times the reflection index of the crystal, the area of the recording mark showing the same maximum CNR becomes approximately 80 percent as compared with both the reflection indexes being the same, thus showing sufficient contribution towards a high recording density. When the reflection index of the non-crystalloid becomes twice the reflection index of the crystal, the area of the recording mark showing the same maximum CNR becomes approximately 60 percent as compared with a case where both the reflection indexes are the same, thus showing a large contribution towards high recording density (Table 4, Table 5).

When the reflection index R2 of the crystal state becomes too small, the amplitude of the reproduction signal becomes too small. When the reflection index R2 of the crystal condition is too large, the light absorption quantity in the recording film becomes small so as to reduce sensitivity. It is found from various experimental results that no problems are caused if R2 is made 80% or more, and 60% or less.

3) When samples having the same reflection index of the crystal state are compared with the structural phase difference being in the range of $(0.5$ through $1.5) \pi+2 n\pi$ radians, and the structural phase difference being the same, the repetition frequency of the recording and erasing operations is improved as the reflection index of the non-crystalline portion becomes higher than the reflection index of the crystalline portion.

4) After the formation of the recording marks of the same area, various power is continuously applied to crystallize the recording marks and to erase the signals. The erasing index is measured. Samples having the same reflection index of the crystal state are compared with the structural phase difference being in the range of $(0.5$ through $1.5) \pi+2 n\pi$ radians, and the structural phase difference being the same. As the reflection index of the non-crystalline portion becomes higher than the reflection index of the crystal portion in the sample, it is found that the range of the erasing power, where the erasing index (for example—20 dB) becomes constant or more, is spread, namely, the erasing power range is spread.

The optical constant of the $Sb_2Se_3$ is characterized in that the extinction coefficient is small. Therefore, the light is transmitted through even in a much thicker film as compared with the recording film in which Ge-Sb-Te are principal components. A large structural phase change is shown up to the thickness of 500 nm at maximum even in the designing of the structural recording medium. Such a construction as the reflection index of the non-crystalline portion becomes higher than the reflection index of the crystal portion exists. The most effective structural phase difference reproduction can be effected when $(1+2n)\pi$ radians and the reflection of the recording portion is larger than the reflection index of the non-recording portion if a substrate without grooves is used in either recording film composition. If the structural phase difference is in the range of the $(0.5$ through $1.5) \pi+2 n\pi$ radians, the signal amplitude of approximately 60 percent or more of the maximum signal amplitude in a case where the structural phase difference is the $(1+2n)\pi$ radians is obtained. This is a sufficiently practical value. In the structural phase difference of (1.5 through 2.5) $\pi+2 n\pi$ radians, the signal amplitude becomes extremely small. As the structural phase is caused with grooves in the grooved substrate, it does not mean that the maximum structural phase difference reproduction amplitude is obtained when the structural phase difference between the recorded portion and the non-recorded portion is $(1+2n)\pi$ radians. At this time, the structural phase difference between the optimum recording portion and the non-recording portion can be determined considering the groove shape (groove interval, groove width, groove depth or the like). It is found that the structural phase difference between the recording portion and the non-recording portion need only be in the range of $(0.5$ through $1.5) \pi+2 n\pi$ radians. When the samples having the same reflection index of the crystal state are compared with the structural phase difference being in the range of $(0.5$ through $1.5) \pi+2 n\pi$ radians and the structural phase difference being the same, the area of the recording mark to be obtained in the maximum amplitude becomes small as the reflection index of the non-crystalline portion becomes higher than the reflection index of the crystal portion. At this time, the value of the maximum amplitude is not known. This fact means that the recording density is raised by the construction in which the reflection index of the non-crystalline portion is higher than the crystal portion. As the difference in the reflection index between the crystal and the non-crystalloid is larger, a large signal amplitude is obtained with respect to small recording mark. When the reflection index of the non-crystalloid is 1.2 times the reflection index of the crystal, the area of the recording mark showing the same maximum signal amplitude becomes approximately 95 percent as compared with a case where both the reflection indexes are the same, and substantial contribution towards a high recording density is small. When the reflection index of the non-crystalloid is 1.3 times the reflection of the crystal, the area of the recording mark showing the same maximum signal amplitude becomes approximately 80 percent as compared with a case where both the reflection indexes are the same, showing a sufficient contribution towards a high recording density. When the reflection index of the non-crystalloid is twice the reflection index of the crystal, the area of the recording mark showing the same maximum signal amplitude becomes approximately 60 percent as compared with a case where both the reflection indexes are the same, showing a large contribution towards a high recording density.

The samples having the same reflection index in the crystal condition are compared with the structural phase difference being in the range of (0.5 through 1.5) $\pi+2$ n$\pi$ radians, and the structural phase difference being the same, and wider erasing characteristics and improved erasing power tolerance is obtained as the reflection index of the non-crystalline portion is higher than the reflection index of the crystal portion. At the same time, an improved repetition frequency of recording and erasing operations is obtained. The reflection index of the crystal state (non-recorded state) is made as small as possible, and it is found out that the noise components of the medium at the time of reproduction become smaller. As the reflection index of the crystal state (non-recorded condition) is made too small, the signal amplitude becomes small. It is found from the actual evaluation of the C/N of the signal that an effect of becoming small in the noise component is larger than the proportion of reducing the signal amplitude. It is found from examination of various recording film materials and the various disk constructions that a better reproduction signal quality can be obtained when the reflection index at the crystal state is restrained to 15% or lower. At this time, the structural phase difference of the recording portion and the non-recording portion is set in the range of (0.5 through 1.5) $\pi+2$ n$\pi$ radians or the reflection index of the recorded portion is set larger than the reflection index of the non-recorded portion.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. An optical information recording medium from which recorded information is reproduced by application of laser beams of a given wavelength, comprising;
   a substrate having concave and convex type signal pits on a surface thereof;
   a reflection layer formed on said surface of said substrate;
   wherein a reflection index of an interior of the signal pits is higher than a reflection index at a periphery of the signal pits with respect to the given wavelength; and
   wherein the reflection layer has a greater film thickness at the interior of the signal pits than at the periphery of the signal pits.

2. An optical information recording medium from which recorded information is reproduced by application of laser beams of a given wavelength, comprising:
   a substrate;
   a layer of material forming concave and convex type signal pits on a surface of said substrate, said material having a refractive index which is different than a refractive index of said substrate;
   a reflection layer of a uniform film thickness formed on and within said signal pits;
   wherein a reflection index of an interior of said signal pits is higher than a reflection index at a periphery of said signal pits with respect to the given wavelength.

3. An optical information recording medium from which recorded information is reproduced by application of laser beams of a given wavelength, comprising:
   a substrate; and
   a phase change recording layer, formed on said substrate, which is erasable and recordable by changing an optical state thereof, said phase change recording layer having recorded regions and non-recorded regions;
   wherein a structural phase difference between a reflection beam of the non-recorded regions and a reflection beam of the recorded regions of the optical information recording medium with respect to application of a laser beam of the given wavelength is in a range of
   (0.5 through 1.5) $\pi \pm 2$ n$\pi$ radians, where n is an integer; and
   wherein a reflection index R1 of the recorded regions of the optical information recording medium is larger than a reflection index R2 of the non-recorded regions with respect to the given wavelength.

4. An optical information recording medium as defined in claim 3, wherein the structural phase difference is
   $(2n+1) \pi$ radians.

5. An optical information recording medium as defined in claim 3, where R1 is at least 1.3 times R2.

6. An optical information recording medium as defined in claim 3, where R1 is at least twice R2.

7. An optical information recording medium as defined in claim 3, wherein the recording layer is composed of a material which reversibly changes optical states upon application of laser beams and has principal components of Ge-Sb-Te, and wherein a thickness of the recording layer is at most 40 nm.

8. An optical recording medium as defined in claim 7, wherein a composition ratio of the principal components is within a range represented by

| $(Ge)_x (Sb)_y (Te)_z$: | |
|---|---|
| $0.10 \leq x \leq 0.35$: | $0.10 \leq y$ |
| $0.45 \leq z \leq 0.65$: | $x + y + z = 1$. |

9. An optical recording medium as defined in claim 7, wherein a composition ratio of the principal components is within a range represented by $(Ge_2Sb_2Te_5)_x (GeSb_2Te_4)_{1-x}$
ti $0 \leq x \leq 1$.

10. An optical information recording medium as defined in claim 3, wherein the recording layer is composed of a material which reversibly changes optical states upon application of laser beams and has principal components of Sb-Se, and wherein a thickness of the recording layer is at most 500 nm.

* * * * *